(12) United States Patent
Wu

(10) Patent No.: US 10,514,568 B2
(45) Date of Patent: Dec. 24, 2019

(54) COLOR FILTER SUBSTRATE AND CURVED SURFACE DISPLAY DEVICE

(71) Applicant: Shenzhen China Star Optoelectronics Technology Co., Ltd., Shenzhen (CN)

(72) Inventor: Chuan Wu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 115 days.

(21) Appl. No.: 14/907,920

(22) PCT Filed: Nov. 9, 2015

(86) PCT No.: PCT/CN2015/094093
§ 371 (c)(1),
(2) Date: Feb. 1, 2018

(87) PCT Pub. No.: WO2017/031834
PCT Pub. Date: Mar. 2, 2017

(65) Prior Publication Data
US 2018/0157101 A1 Jun. 7, 2018

(30) Foreign Application Priority Data
Aug. 26, 2015 (CN) .......................... 2015 1 0531830

(51) Int. Cl.
*G02F 1/1335* (2006.01)

(52) U.S. Cl.
CPC .. *G02F 1/133514* (2013.01); *G02F 1/133512* (2013.01)

(58) Field of Classification Search
None
See application file for complete search history.

(56) References Cited

U.S. PATENT DOCUMENTS

| 2001/0026347 A1* | 10/2001 | Sawasaki .......... G02F 1/133707 349/156 |
| 2008/0137013 A1* | 6/2008 | Kamoshida ....... G02F 1/133305 349/106 |
| 2010/0001939 A1* | 1/2010 | Ochiai .............. G02F 1/133512 345/88 |

(Continued)

FOREIGN PATENT DOCUMENTS

| CN | 104076552 A | 10/2014 |
| CN | 104407469 A | 3/2015 |
| CN | 104570517 A | 4/2015 |

OTHER PUBLICATIONS

Office Action dated Jul. 27, 2017, by the State Intellectual Property Office of People's Republic of China in corresponding Chinese Patent Application No. 201510531830.1. (6 pages).

*Primary Examiner* — Ryan Crockett

(57) ABSTRACT

A color filter substrate and a curved surface display device are disclosed. The technical field of display is related to. Dark stripes appearing at a position corresponding to a central line of a sub pixel region can be eliminated, and a display effect of the curved display device can be improved. The color filter substrate includes a first light shading region corresponding to a gate line and a data line of an array substrate; and a second light shading region corresponding to a central line of a sub pixel region of the array substrate. A width of the second light shading region is larger than a width of the central line of the sub pixel region.

8 Claims, 5 Drawing Sheets

(56) References Cited

U.S. PATENT DOCUMENTS

| | | | |
|---|---|---|---|
| 2015/0029449 A1* | 1/2015 | Woo | G02F 1/133512 349/110 |
| 2015/0378070 A1* | 12/2015 | Wu | G02B 5/201 359/885 |
| 2016/0139457 A1* | 5/2016 | Wu | G02F 1/133512 349/62 |
| 2017/0255069 A1* | 9/2017 | Wu | G02F 1/133345 |
| 2017/0285392 A1* | 10/2017 | Hirata | G02F 1/133308 |
| 2018/0031906 A1* | 2/2018 | Park | G02F 1/133512 |

\* cited by examiner

COLOR FILTER SUBSTRATE AND CURVED SURFACE DISPLAY DEVICE

CROSS REFERENCE TO RELATED APPLICATIONS

The present application claims the priority of Chinese patent application CN201510531830.1, entitled "Color Filter Substrate and Curved Surface Display Device" and filed on Aug. 26, 2015, the entirety of which is incorporated herein by reference.

FIELD OF THE INVENTION

The present disclosure relates to the technical field of display, and particularly to a color filter substrate and a curved surface display device.

BACKGROUND OF THE INVENTION

A curved display device has a curved display screen. In a curved display screen, each of the pixels has a same distance to eye, and thus a lifelike visual experience can be obtained. Therefore, the curved display device has a stronger competitiveness compared with traditional flat display device.

A manufacturing procedure of the curved display device will be illustrated below. As shown in FIG. 1, first, a flat array substrate 2 and a flat color filter substrate 1 are manufactured; then, a liquid crystal cell is formed by the array substrate 2 and the color filter substrate 1, i.e., a flat liquid crystal panel is formed; at last, the flat liquid crystal panel is bent into a curved liquid crystal panel. As shown in FIG. 2, the array substrate 2 is provided with a plurality of gate lines 22 and data lines 21, and a plurality of sub pixel regions formed by the gate lines 22 and the data lines 21. The color filter substrate 1 is provided with a black matrix and sub pixel regions formed by the black matrix. In the flat liquid crystal panel formed by the array substrate 2 and the color filter substrate 1, the black matrix on the color filter substrate 1 corresponds to the gate lines 22 and the data lines 21 on the array substrate 2, so that the gate lines 22 and the data lines 21 are shaded by the black matrix; and the sub pixel regions on the color filter substrate 1 correspond to the sub pixel regions on the array substrate 2 one by one to form an opening area of the display device.

However, as shown in FIG. 1, when the flat liquid crystal display device is bent into the curved liquid crystal display device, a right side and a left side of the color filter substrate 1 would move rightward and leftward respectively relative to the array substrate 2, and a moving distance gets larger when a distance between a part of the color filter substrate 1 to a longitudinal central axis (as shown in FIG. 1, the dash dot line runs through the longitudinal central axis of the color filter substrate 1) thereof becomes larger.

As shown in FIGS. 2 and 3, the array substrate 2 is not only provided with a gate line 22, a data line 21, and a Thin Film Transistor (TFT) 23 surrounding each sub pixel region, but also provided with a shading layer 24 directly surrounding each sub pixel region. As shown in FIG. 3, the shading layer 24 is arranged below a pixel electrode 26. An insulation layer 27 is arranged between the shading layer 24 and the pixel electrode 26. The shading layer 24 is arranged in a layer the same as the gate lines 22, while different from the data lines 21. The shading layer 24 has a central line 25 at a center thereof, and a deflection angle of liquid crystal 3 in a sub pixel region at one side of the central line 25 is different from a deflection angle of liquid crystal 3 in a sub pixel region at the other side thereof. Since the color filter substrate 1 moves relative to the array substrate 2, the liquid crystal 3 corresponding to the central line 25 would have a disordered orientation and cannot be recovered. As a result, dark stripes would appear at a position of the display device corresponding to the central line 25, and thus a display effect of the curved display device would be adversely affected.

SUMMARY OF THE INVENTION

The present disclosure provides a color filter substrate and a curved surface display device so as to eliminate dark stripes which would otherwise appear at a position corresponding to a central line of a sub pixel region and to improve a display effect of the display device.

According to a first aspect, the present disclosure provides a color filter substrate, which comprises:

a first light shading region corresponding to a gate line and a data line of an array substrate; and a second light shading region corresponding to a central line of a sub pixel region of the array substrate, wherein a width of the second light shading region is larger than a width of the central line of the sub pixel region.

Preferably, widths of respective second light shading regions increase gradually from a longitudinal central axis of the color filter substrate to two sides of the color filter substrate away from the longitudinal central axis.

Preferably, each second light shading region extends along a direction near to the longitudinal central axis, and extending widths of the second light shading regions increase gradually from the longitudinal central axis to two sides of the color filter substrate away from the longitudinal central axis.

Preferably, each second light shading region extends along two directions near to the longitudinal central axis and away from the longitudinal central axis respectively, and extending widths of the second light shading regions increase gradually from the longitudinal central axis to two sides of the color filter substrate away from the longitudinal central axis.

Preferably, the width of the second light shading region is equal to a sum of the width of the central line and a deviation amount of the second light shading region from a corresponding central line.

Preferably, the width of the second light shading region is equal to a sum of the width of the central line and twice a deviation amount of the second light shading region from a corresponding central line.

Preferably, the first light shading region and the second light shading region define a color filter region of the color filter substrate.

Preferably, the color filter region comprises a red color filter region, a green color filter region, and a blue color filter region.

Preferably, the second light shading region completely shades the central line of the sub pixel region when the color filter substrate is in a curved state.

The following beneficial effects can be brought about according to the present disclosure. The color filter substrate is provided with the second light shading region corresponding to the central line of the sub pixel region of the array substrate. In this manner, when the color filter substrate and the array substrate form a liquid crystal cell and the flat liquid crystal panel is bent into a curved liquid crystal panel, dark stripes can be shaded by the second light shading region which have a width larger than a width of the central line of the corresponding sub pixel region even if the color filter substrate moves relative to the array substrate and dark stripes appear at a position corresponding to the central line of the sub pixel region. When an image is displayed on the curved display device, no dark stripe can be watched in the sub pixel region, and thus a display effect of the curved displayed device can be ensured.

According to a second aspect, the present disclosure provides a curved surface display device, which comprises a color filter substrate and an array substrate. The color filter substrate and the array substrate can form a liquid crystal cell.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments are introduced briefly below to illustrate the technical solutions of the embodiments of the present disclosure more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Figure 4:
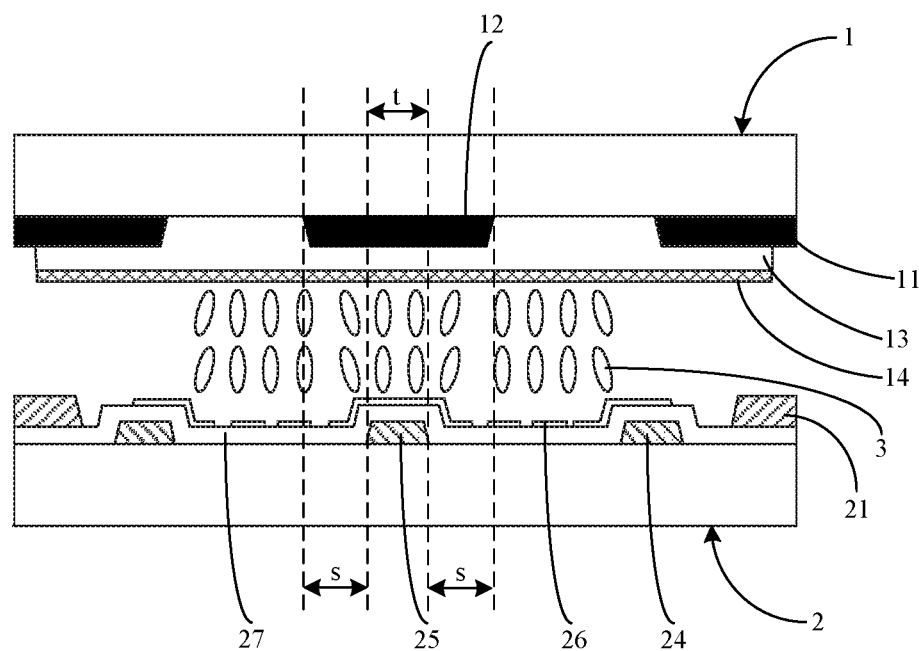
FIGS. 4, 6, and 8 schematically show a cooperation of an array substrate and a color filter substrate before the substrates are curved.

The present embodiment provides a color filter substrate 1, which can be used in a curved display device. As shown in FIG. 4, the color filter substrate 1 and an array substrate 2 can form a curved liquid crystal panel, and the color filter substrate 1 comprises a first light shading region 11 corresponding to a gate line 22 and a data line 21 of the array substrate 2. The first light shading region 11 can not only shade the gate line 22 and the data line 21 which define each sub pixel region, but also define an active area of each sub pixel region. Moreover, a picture contrast of two adjacent sub pixel regions with different colors can be improved.

Figure 5:
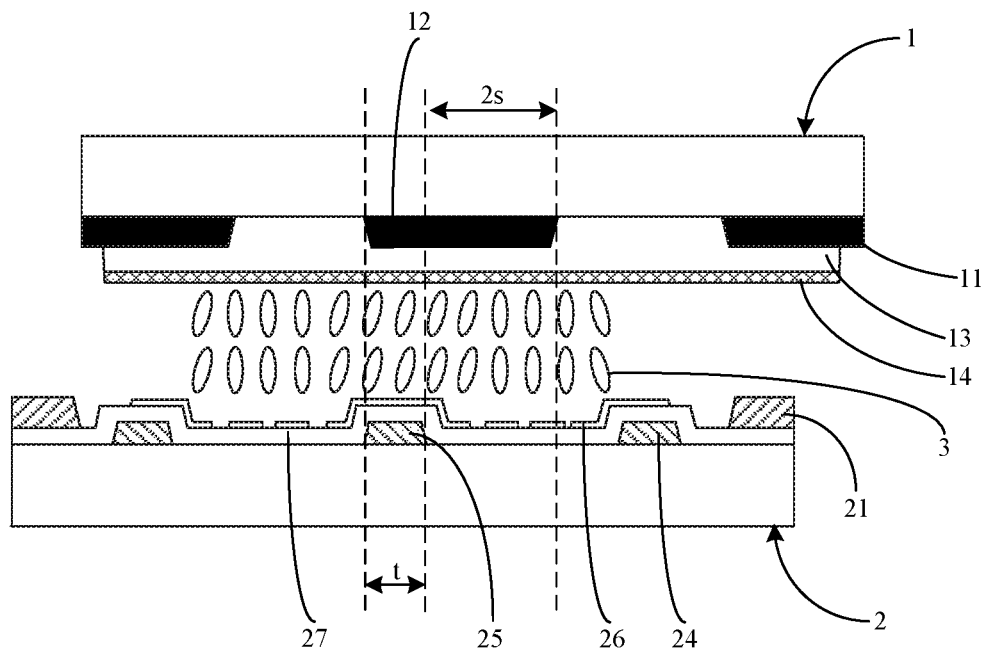
FIGS. 5, 7, and 9 schematically show a cooperation of an array substrate and a color filter substrate after the substrates are curved.

As shown in FIG. 4, the color filter substrate 1 further comprises a second light shading region 12 corresponding to a central line 25 of a sub pixel region of the array substrate 2. As shown in FIG. 5, dark stripes which are generated due to disordered orientation of liquid crystal 3 in a position corresponding to the central line 25 when the color filter substrate 1 moves relative to the array substrate 2 can be shaded by the second light shading region 12. Moreover, since dark stripes generally appear at a position corresponding to the central line 25 or near to the central line 25, a width of the second light shading region 12 should be larger than a width of the central line 25 of the sub pixel region, so that the dark stripes can be completely shaded, and a display effect of the curved display device can be ensured.

According to the present embodiment, the color filter substrate 1 is provided with the second light shading region 12 corresponding to the central line 25 of the sub pixel region of the array substrate 2. In this manner, when the color filter substrate 1 and the array substrate 2 form a liquid crystal cell and the flat liquid crystal panel is bent into a curved liquid crystal panel, dark stripes can be shaded by the second light shading region 12 which have a width larger than a width of the central line 25 of the corresponding sub pixel region even if the color filter substrate 1 moves relative to the array substrate 2 (as shown in FIG. 5) and dark stripes appear at a position corresponding to the central line 25 of the sub pixel region. When an image is displayed on the curved display device, no dark stripe can be watched in the sub pixel region, and thus a display effect of the curved displayed device can be ensured.

According to the present embodiment, since the width of the second light shading region 12 is larger than a width of the central line 25 of the sub pixel region, not only dark stripes would be shaded by the second light shading region 12, but also a normal region in which no dark stripe appears would possibly be shaded by the second light shading region 12 when the color filter substrate 1 and the array substrate 2 form a liquid crystal cell and the substrates are curved. However, since an aperture ratio of the normal region is reduced to some extent, the normal region would have brightness the same as brightness of a region in which dark stripes appear, and the curved display device would have a uniform brightness on the whole.

The first light shading region 11 and the second light shading region 12 define a color filter region 13 of the color filter substrate 1. If the curved display device which comprises the color filter substrate 1 is a three-color (i.e., red, green, and blue) display device, the color filter region 13 of the color filter substrate 1 comprises a red color filter region, a green color filter region, and a blue color filter region. If the curved display device which comprises the color filter substrate 1 is a four-color (i.e., red, green, blue, and white) display device, the color filter region 13 of the color filter substrate 1 comprises a red color filter region, a green color filter region, a blue color filter region, and a transparent color filter region.

In addition, as shown in FIG. 4, the color filter substrate 1 further comprises a common electrode 14 cooperating with a pixel electrode 26 of the array substrate 2.

Figure 1:
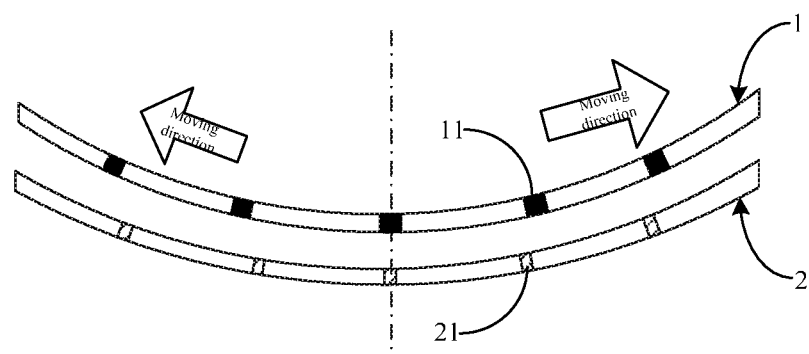
FIG. 1 schematically shows a deviation of a color filter substrate of a curved display device in the prior art.
Figure 2:
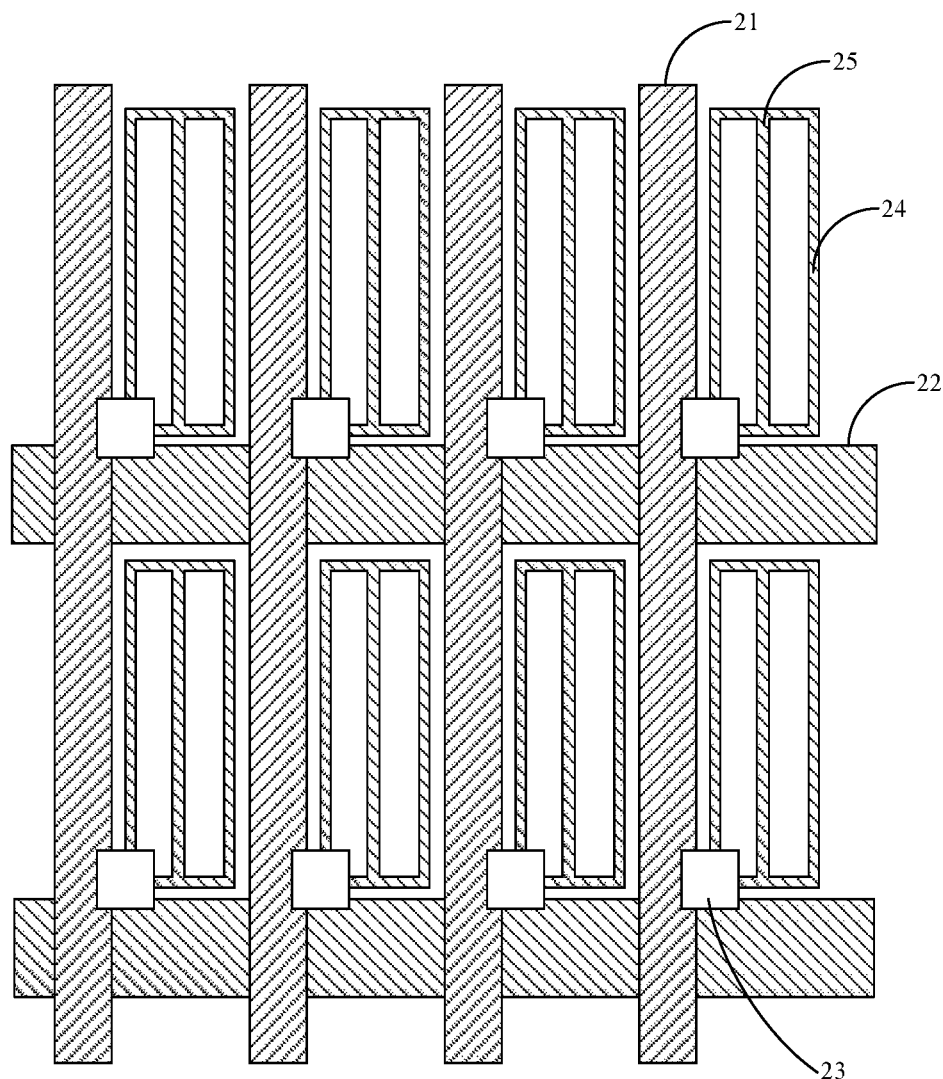
FIG. 2 schematically shows an array substrate in the prior art.
Figure 3:
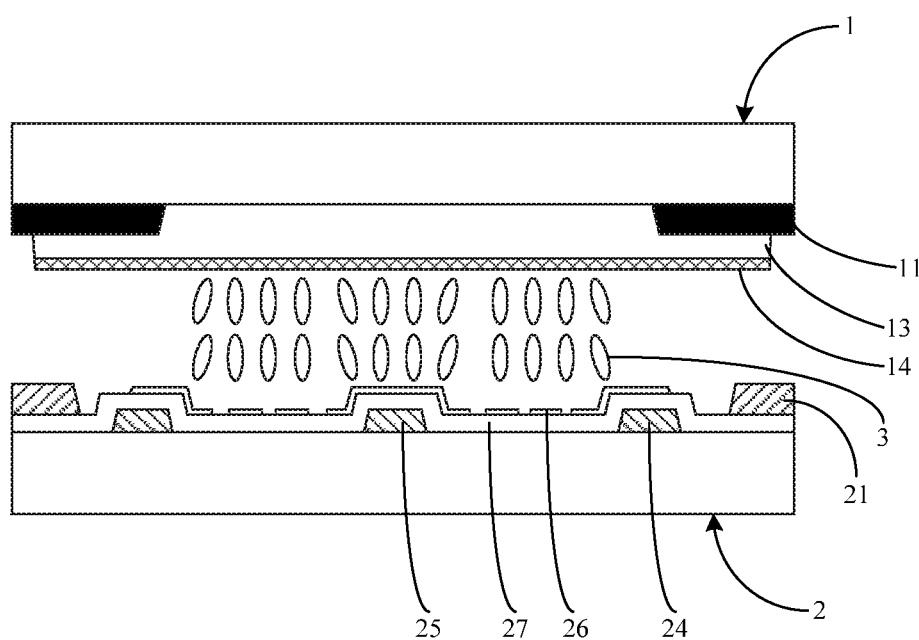
FIG. 3 schematically shows a cooperation of an array substrate and a color filter substrate in the prior art.

When a flat liquid crystal display panel is bent into a curved liquid crystal display panel, as shown in FIG. 1, a right side and a left side of the color filter substrate 1 would move rightward and leftward respectively relative to the array substrate 2, and a moving distance gets larger when a distance between a part of the color filter substrate 1 to a longitudinal central axis thereof becomes larger. Therefore, in order to ensure that dark stripes formed at a region corresponding to the central line 25 of each sub pixel region and at a region around the central line 25 thereof can be completely shaded and ensure a visual experience of audience, according to the present embodiment, the width of each second light shading region 12 increases gradually from a longitudinal central axis of the color filter substrate 1 to two sides far therefrom.

Specifically, when a curvature of a curved display panel is determined, a deviation amount of different parts of the color filter substrate 1 relative to the array substrate 2 can be obtained according to experimental data and through analysis. In this manner, a size of the dark stripe region can be obtained, and the width of the second light shading region 12 can be determined accordingly.

As shown in FIG. 4, it is assumed that the width of the central line 25 of each sub pixel region is t, and a deviation amount of the color filter substrate 1 corresponding to the central line 25 of a certain sub pixel region is s. The right side and the left side of the color filter substrate 1 would move rightward and leftward respectively relative to the array substrate 2. Therefore, according to the present disclosure, the second light shading region 12 can be widened to two sides, and thus the width of the second light shading region 12 corresponding to the certain sub pixel region should be t+2s. That is, the width of the second light shading region 12 is equal to a sum of the width of the central line 25 and twice a deviation amount of the second light shading region 12 from a corresponding central line 25.

When the color filter substrate 1 and the array substrate 2 form the liquid crystal cell and the color filter substrate 1 moves relative to the array substrate 2, as shown in FIG. 5, the central line 25 of the sub pixel region of the array substrate 2 is shaded by the corresponding second light shading region 12. Therefore, in the curved display device, dark stripes resulted from the deviation of the color filter substrate 1 can be shaded by the second light shading region 12. The normal region in which no dark stripe appears would be shaded with a same width, and thus the display device can have a same brightness on the whole.

Further, when the curvature of the curved display device is determined, a deviation direction and deviation amount of each part of the color filter substrate 1 relative to the array substrate 2 can be determined. That is, the region in which dark stripes would appear can be determined. Therefore, as shown in FIGS. 6 to 9, the second light shading region 12 which is used for shading the dark stripes can be widened to one side according to the moving direction of the color filter substrate 1 so as to improve an aperture ratio of the color filter substrate 1.

The moving distance of the color filter substrate 1 relative to the array substrate 2 gets larger when a distance between a part of the color filter substrate 1 to a longitudinal central axis thereof becomes larger. With respect to one part of the color filter substrate 1, a moving distance and moving direction thereof relative to the array substrate 2 can be determined. Specifically, the left part of the color filter substrate 1 would move leftward relative to the array substrate 2, and the right part of the color filter substrate 1 would move rightward relative to the array substrate 2.

Figure 6:
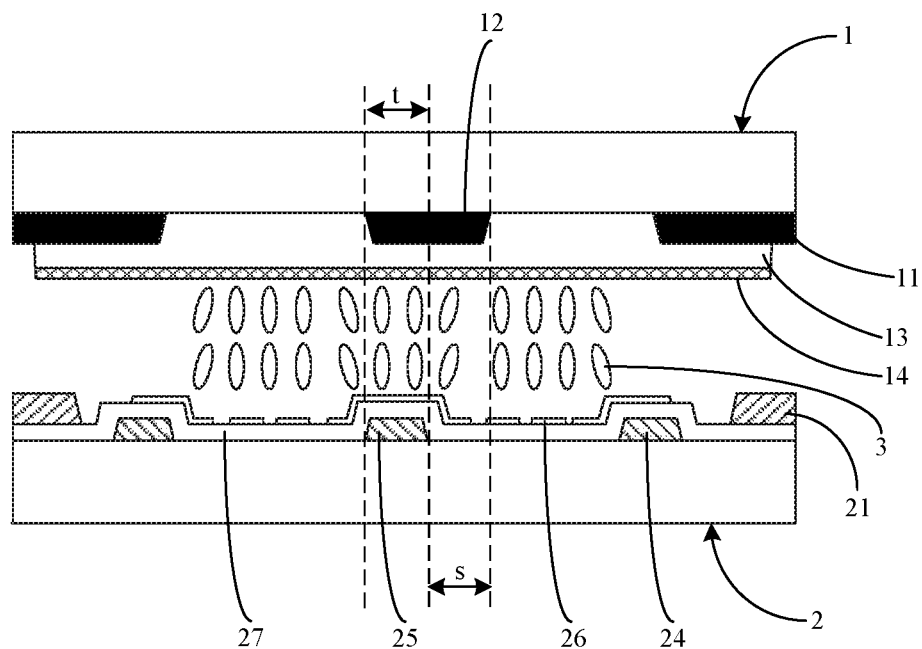
Figure 7:
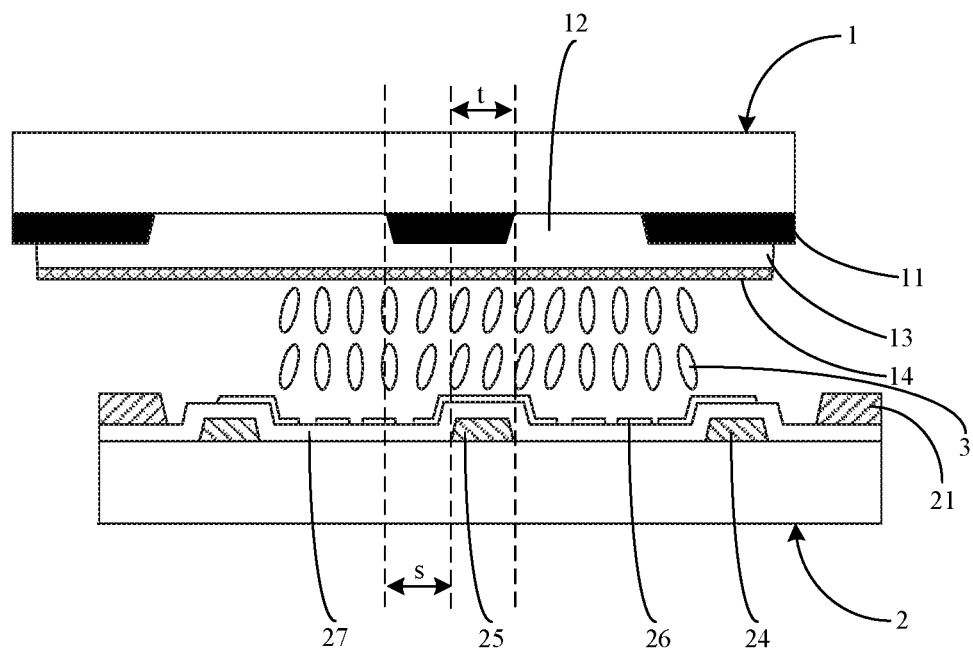

As shown in FIGS. 6 and 7, in the left part of the color filter substrate 1 of a flat liquid crystal display panel, each second light shading region 12 corresponding to the central line 25 of the sub pixel region should extend rightward, and an extending amount should be equal to the moving amount of the color filter substrate 1. In this manner, when the display panel formed by the color filter substrate 1 and the array substrate 2 is curved and the left part of the color filter substrate 1 moves leftward, the dark stripes can be completely shaded by the second light shading region 12. As shown in FIG. 6, with respect to a certain sub pixel region of the left part of the color filter substrate 1, if the width of the central line 25 of the sub pixel region is t and the moving amount (to the left side) of the color filter substrate 1 is s, an extending amount of the second light shading region 12 of the color filter substrate 1 should be arranged as s to the right side. That is, the width of the second light shading region 12 should be t+s. As shown in FIG. 7, when the display panel formed by the color filter substrate 1 and the array substrate 2 is curved, the color filter substrate 1 would move s to the left side relative to the array substrate 2, and the dark stripes can be completely shaded by the second light shading region 12 which has the extending amount s to the right side.

Figure 8:
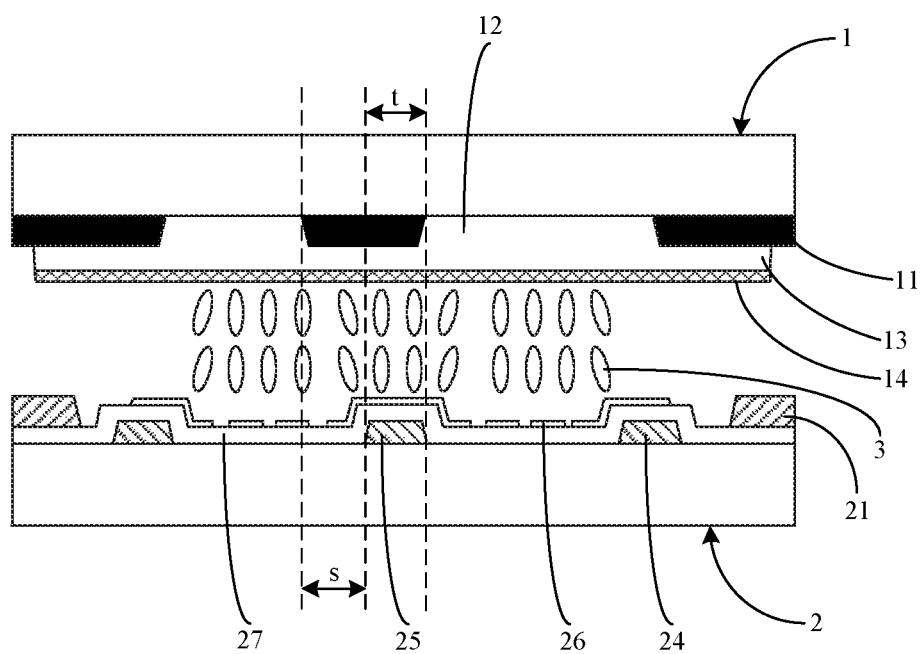
Figure 9:
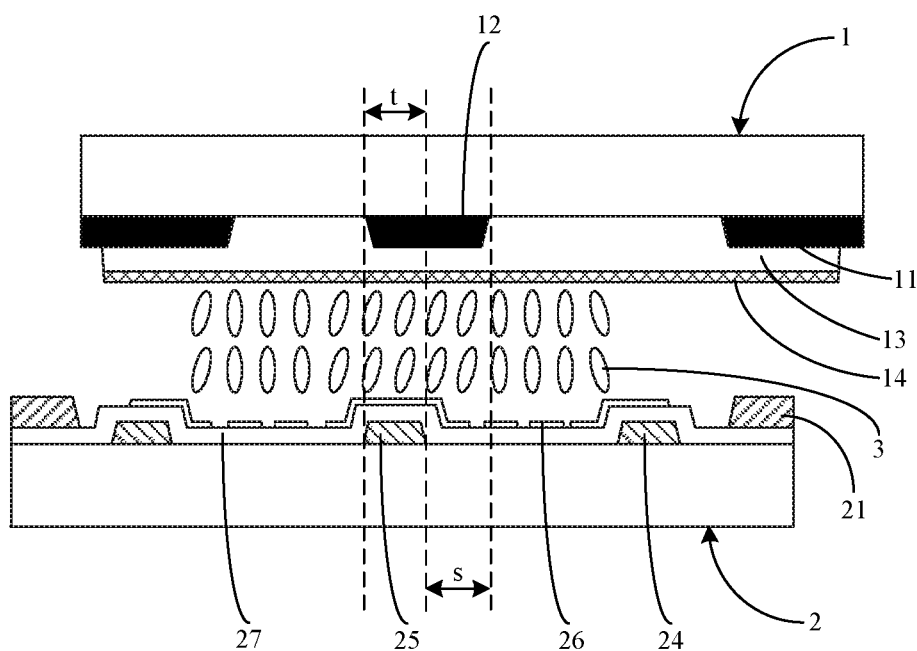

Similarly, as shown in FIGS. 8 and 9, in the right part of the color filter substrate 1 of the flat liquid crystal display panel, the second light shading region 12 should extend leftward. In this manner, when the display panel formed by the color filter substrate 1 and the array substrate 2 is curved and the right part of the color filter substrate 1 moves rightward, the dark stripes can be completely shaded by the second light shading region 12. As shown in FIG. 8, with respect to a certain sub pixel region of the right part of the color filter substrate 1, if the width of the central line 25 of the sub pixel region is t and the moving amount (to the right side) of the color filter substrate 1 is s, an extending amount of the second light shading region 12 of the color filter substrate 1 should be arranged as s to the left side. That is, the width of the second light shading region 12 should be t+s. As shown in FIG. 9, when the display panel formed by the color filter substrate 1 and the array substrate 2 is curved, the color filter substrate 1 would move s to the right side relative to the array substrate 2, and the dark stripes can be completely shaded by the second light shading region 12 which has the extending amount s to the left side.

According to the present embodiment, each second light shading region 12 extends to a direction near to the longitudinal central axis, and an extending width of each second light shading region 12 increases gradually from the longitudinal central axis to two sides far therefrom. Specifically, the width of the second light shading region 12 is equal to a sum of the width of the central line 25 and a deviation amount of the second light shading region 12 from a corresponding central line 25.

The embodiment further provides a curved display device, which comprises the aforesaid color filter substrate 1 and an array substrate 2. The color filter substrate 1 and the array substrate 2 can form a liquid crystal cell so as to form the curved display device.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A color filter substrate, comprising: a first light shading region corresponding to a gate line and a data line of an array substrate; and a second light shading region corresponding to a central line of a sub pixel region of the array substrate, wherein a width of the second light shading region is larger than a width of the central line of the sub pixel region;

wherein each second light shading region extends along a direction near to the longitudinal central axis such that each second light shading region covers a corresponding central line and a deviation region arranged on one side of the corresponding central line and connected with the corresponding central line and not covers a region arranged on the other side of the corresponding central line in a view along a direction perpendicular to the color filter substrate, and extending widths of the second light shading regions increase gradually from the longitudinal central axis to two sides of the color filter substrate away from the longitudinal central axis;

wherein the width of the second light shading region is equal to a sum of the width of the central line and a deviation amount of the second light shading region from a corresponding central line.

2. The color filter substrate according to claim 1, wherein the first light shading region and the second light shading region define a color filter region of the color filter substrate.

3. The color filter substrate according to claim 2, wherein the color filter region comprises a red color filter region, a green color filter region, and a blue color filter region.

4. The color filter substrate according to claim 1, wherein the second light shading region completely shades the central line of the sub pixel region when the color filter substrate is in a curved state.

5. A curved surface display device, comprising a color filter substrate and an array substrate which form a liquid crystal cell together, wherein the color filter substrate comprises: a first light shading region corresponding to a gate line and a data line of the array substrate; and a second light shading region corresponding to a central line of a sub pixel region of the array substrate, wherein a width of the second light shading region is larger than a width of the central line of the sub pixel region;

wherein each second light shading region extends along a direction near to the longitudinal central axis such that each second light shading region covers a corresponding central line and a deviation region arranged on one side of the corresponding central line and connected with the corresponding central line and not covers a region arranged on the other side of the corresponding central line in a view along a direction perpendicular to the color filter substrate, and extending widths of the second light shading regions increase gradually from the longitudinal central axis to two sides of the color filter substrate away from the longitudinal central axis;

wherein the width of the second light shading region is equal to a sum of the width of the central line and a deviation amount of the second light shading region from a corresponding central line.

6. The display device according to claim 5, wherein the first light shading region and the second light shading region define a color filter region of the color filter substrate.

7. The display device according to claim 6, wherein the color filter region comprises a red color filter region, a green color filter region, and a blue color filter region.

8. The display device according to claim 5, wherein the second light shading region completely shades the central line of the sub pixel region when the color filter substrate is in a curved state.

* * * * *